(12) United States Patent
Coers et al.

(10) Patent No.: US 8,079,204 B2
(45) Date of Patent: Dec. 20, 2011

(54) FEEDER HOUSE TWIST DAMPENING SYSTEM

(75) Inventors: Bruce A. Coers, Hillsdale, IL (US); Paul D. Marvin, Dewitt, IA (US); John A. Schraeder, Geneseo, IL (US)

(73) Assignee: Deere & Company, Moline, IL (US)

( * ) Notice: Subject to any disclaimer, the term of this patent is extended or adjusted under 35 U.S.C. 154(b) by 469 days.

(21) Appl. No.: 12/235,087

(22) Filed: Sep. 22, 2008

(65) Prior Publication Data

US 2010/0071330 A1    Mar. 25, 2010

(51) Int. Cl.
*A01D 34/00* (2006.01)
(52) U.S. Cl. ........................................................ 56/15.8
(58) Field of Classification Search ............. 56/10.9, 56/11.9, 12.6, 13.5, 14.3–14.7, 14.9–15.3, 56/15.6, 15.8, 15.9, 16.3, DIG. 9, DIG. 11
See application file for complete search history.

(56) References Cited

U.S. PATENT DOCUMENTS

| | | | | |
|---|---|---|---|---|
| 4,307,559 A * | 12/1981 | Jupp et al. | ....................... | 56/11.9 |
| 6,151,874 A * | 11/2000 | Eis | .............................. | 56/10.2 E |
| 6,510,680 B2 * | 1/2003 | Uhlending et al. | .............. | 56/208 |
| 6,644,004 B2 * | 11/2003 | Reimers et al. | ................ | 56/14.7 |
| 6,860,093 B2 * | 3/2005 | Scordilis | ......................... | 56/15.2 |
| 6,996,961 B2 * | 2/2006 | Nickel et al. | ................. | 56/16.4 C |
| 7,207,164 B2 * | 4/2007 | Bomleny | ...................... | 56/10.2 E |
| 7,430,846 B2 * | 10/2008 | Bomleny et al. | ............ | 56/10.2 E |
| 7,520,115 B2 * | 4/2009 | Coers et al. | ..................... | 56/15.8 |
| 7,596,935 B2 * | 10/2009 | Bollinger et al. | ............... | 56/14.9 |
| 2006/0254239 A1 * | 11/2006 | Fackler et al. | .................. | 56/15.8 |
| 2007/0283673 A1 * | 12/2007 | Coers et al. | ..................... | 56/15.8 |
| 2008/0078155 A1 * | 4/2008 | Coers et al. | ..................... | 56/15.8 |

* cited by examiner

*Primary Examiner* — Thomas Will
*Assistant Examiner* — Mai Nguyen
(74) *Attorney, Agent, or Firm* — Taylor IP, P.C.

(57) ABSTRACT

An agricultural harvester includes a feeder house drivably coupled to a power source. The feeder house has a housing frame. A faceplate is pivotally coupled to the housing frame to facilitate a pivoting of the faceplate relative to the housing frame. A hydraulic cylinder has a first end connected to the housing frame and a second end coupled to the faceplate to facilitate movement of the faceplate relative to the housing frame. The hydraulic cylinder has a plurality of hydraulic ports for facilitating movement of the operating piston of the hydraulic cylinder, with at least a first hydraulic port of the plurality of hydraulic ports being connected in fluid communication with a hydraulic power system. A first accumulator containing a compressible gas charge is connected in fluid communication with the first hydraulic port of the hydraulic cylinder.

14 Claims, 5 Drawing Sheets

FEEDER HOUSE TWIST DAMPENING SYSTEM

FIELD OF THE INVENTION

The present invention relates to agricultural harvesters, and, more particularly, to a feeder house twist dampening system for an agricultural harvester.

BACKGROUND OF THE INVENTION

An agricultural harvester, such as a combine, includes a feeder house to which is mounted a harvesting header. The harvesting header gathers crop material from the field, and the feeder house transports the gathered crop material toward the threshing and separating assemblies of the combine. The combine includes a hydraulic system, including lift cylinders for raising and lowering the harvesting header. As the width of harvesting headers increase, a larger twist load may be experienced by the feeder house to which the harvesting header is mounted. In a rigidly mounted system, for example, the shock loads experienced by the feeder house and the associated hydraulics may be considerable, resulting in a twisting of the feeder house in one or more dimensions and/or the rupture of hydraulic lines or hydraulic components of the system.

SUMMARY OF THE INVENTION

The invention provides a feeder house twist dampening system for an agricultural harvester.

The invention, in one form thereof, is directed to an agricultural harvester. The agricultural harvester includes a power source, a hydraulic power system coupled to the power source, and a feeder house drivably coupled to the power source. The feeder house has a housing frame. A faceplate is pivotally coupled to the housing frame to facilitate a pivoting of the faceplate relative to the housing frame on at least one axis of motion. A hydraulic cylinder has a first end, a second end, and an operating piston. The first end is connected to the housing frame and the second end is coupled to the faceplate to facilitate movement of the faceplate relative to the housing frame. The hydraulic cylinder has a plurality of hydraulic ports for facilitating movement of the operating piston of the hydraulic cylinder, with at least a first hydraulic port of the plurality of hydraulic ports being connected in fluid communication with the hydraulic power system. A first accumulator that contains a first compressible gas charge is connected in fluid communication with the first hydraulic port of the hydraulic cylinder.

The invention, in another form thereof, is directed to an agricultural harvester having a power source, a hydraulic power system coupled to the power source, and a feeder house drivably coupled to the power source. The feeder house has a housing frame. A faceplate is pivotally connected to the housing frame to facilitate a lateral pivoting of the faceplate relative to the housing frame on an axis of motion. A lateral tilt hydraulic cylinder has a first end, a second end, and an operating piston. The first end is connected to the housing frame and the second end is connected to the faceplate to facilitate movement of the faceplate relative to the housing frame on the axis of motion. The lateral tilt hydraulic cylinder has a first hydraulic port and a second hydraulic port in fluid communication with the hydraulic power system for effecting movement of an operating piston of the lateral tilt hydraulic cylinder. A first accumulator is connected in fluid communication with the first hydraulic port of the lateral tilt hydraulic cylinder. The first accumulator contains a first compressible gas charge. A second accumulator is connected in fluid communication with the second hydraulic port of the lateral tilt hydraulic cylinder. The second accumulator contains a second compressible gas charge.

The invention, in another form thereof, is directed to an agricultural harvester including a power source, a hydraulic power system coupled to the power source, and a feeder house drivably coupled to the power source. The feeder house has a housing frame. An intermediate plate is pivotally connected to the housing frame to facilitate a fore-aft pivoting of the intermediate plate relative to the housing frame on a first axis of motion. A faceplate is coupled to the intermediate plate to facilitate mounting of a harvesting header. A fore-aft hydraulic cylinder has a first end, a second end, and an operating piston. The first end is connected to the housing frame and the second end is connected to the intermediate plate to facilitate movement of the intermediate plate relative to the housing frame. The fore-aft hydraulic cylinder has a plurality of hydraulic ports for effecting movement of the operating piston of the fore-aft hydraulic cylinder, with a first hydraulic port of the plurality of hydraulic ports being connected in fluid communication with the hydraulic power system. An accumulator is connected in fluid communication with the first hydraulic port of the fore-aft hydraulic cylinder. The first accumulator contains a first compressible gas charge.

DETAILED DESCRIPTION OF THE INVENTION

Figure 1:
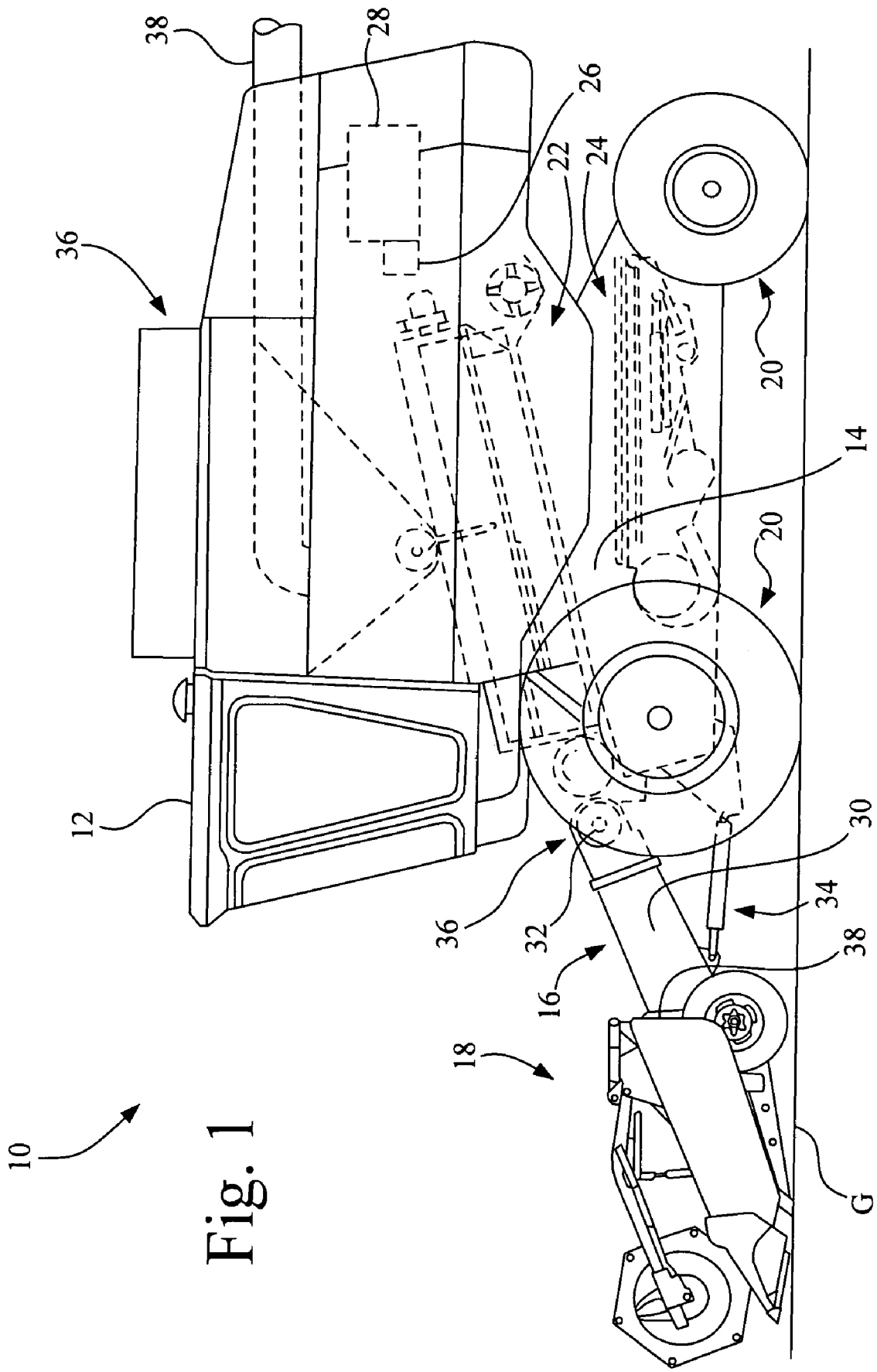
FIG. 1 is a diagrammatic side view of an agricultural harvester in the form of a self-propelled combine configured in accordance with an embodiment of the present invention.

Referring now to the drawings, and more particularly to FIG. 1, there is shown an embodiment of an agricultural harvester in the form of a self-propelled combine 10 commonly used in a grain farming operation to harvest a variety of crops from a field. An operator controls combine 10 from an operator's station located in a cab 12.

Combine 10 includes a support structure 14, e.g., a frame, to which components and assemblies of combine 10 are mounted. At a front end of combine 10 is a feeder house 16 that is configured to carry a harvesting header 18. Ground engaging wheels 20 support and propel combine 10. Threshing and separating assemblies 22, and cleaning assembly 24, perform crop threshing, separating and cleaning functions. Hydraulic functions of combine 10 are powered by a hydraulic power system 26 (shown schematically by a dashed rectangle). In the embodiment shown, an onboard power source 28 (shown schematically by a dashed rectangle) includes an engine and power transmission system for providing power to feeder house 16, harvesting header 18, ground engaging wheels 20, threshing and separating assemblies 22, cleaning assembly 24, hydraulic power system 26, etc.

While harvesting header 18 is shown as a small grain header, e.g., for harvesting wheat, soybeans, etc., harvesting header 18 represents other types of headers as well. For example, other embodiments of harvesting header 18 may be in the form of a corn header for harvesting corn.

Figure 2:
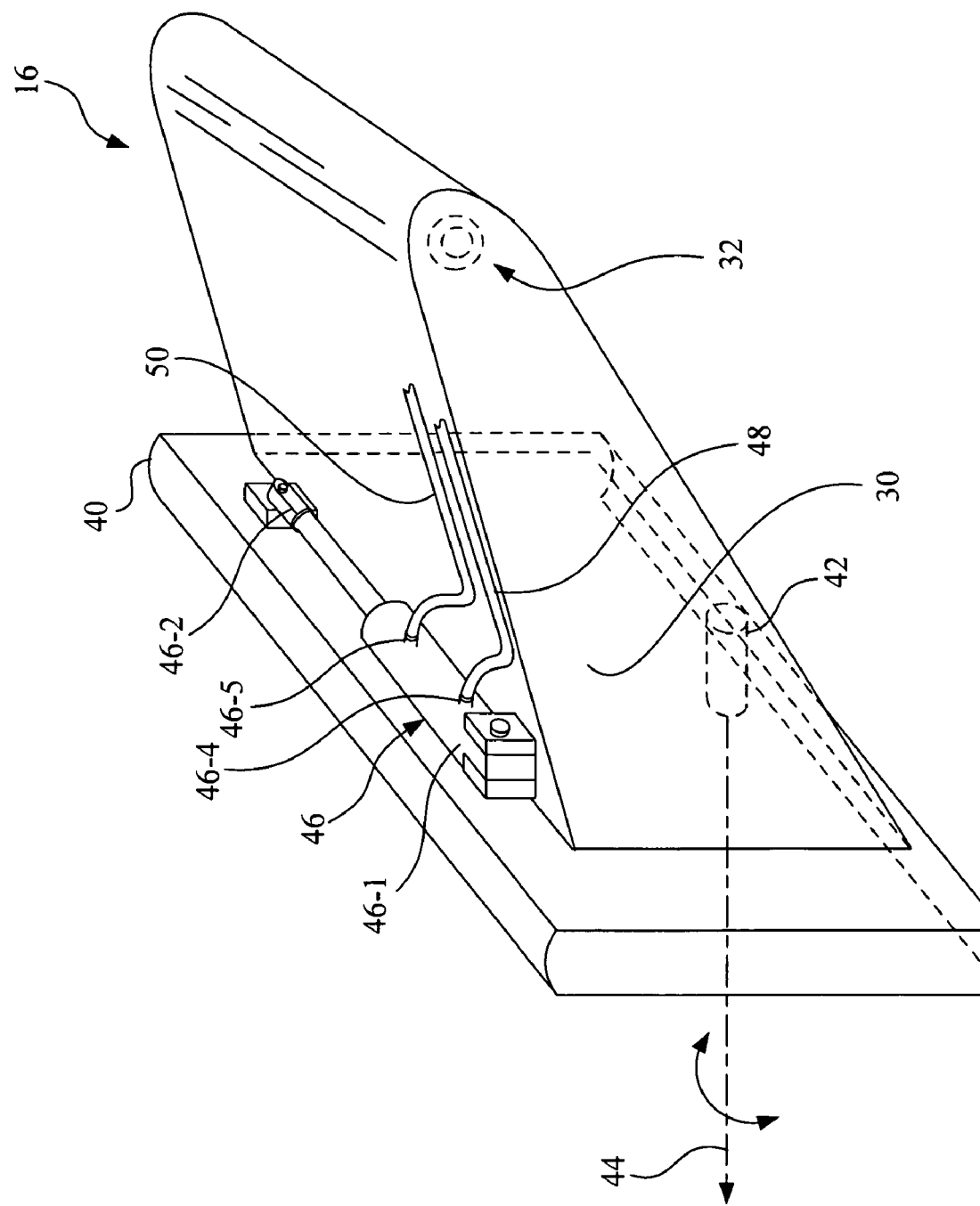
FIG. 2 is a diagrammatic perspective view of the feeder house of the combine of FIG. 1.

Referring also to FIG. 2, feeder house 16 includes a housing frame 30 that is pivotally mounted to support structure 14 by pivots 32. Pivots 32 may be, for example, a shaft/bearing arrangement. A pair of lift cylinders 34 is mounted in a known manner between support structure 14 and feeder house 16 to support and articulate feeder house 16 relative to support structure 14, enabling the raising and lowering of feeder house 16, and in turn, harvesting header 18, relative to the ground G.

Lift cylinders 34 may be single or double acting hydraulic cylinders connected to hydraulic power system 26 of combine 10 by associated control valves and fluid conduits. Hydraulic power system 26 may include, for example, a hydraulic pump, a fluid reservoir, and associated fluid conduits, as is typical in the art, with the hydraulic pump being driven by power source 28.

During a harvesting operation, combine 10 moves forward through the field with harvesting header 18 positioned at a working height. Harvesting header 18 collects and transfers crop material to feeder house 16, which in turn transfers the crop material into combine 10. Once inside the combine, threshing and separating assemblies 22 remove grain from the crop material, cleaning assembly 24 cleans the grain, and the cleaned grain is transferred to a grain tank 36 for temporary holding. Crop material other than grain exits from the rear of the combine 10. An unloading auger 38 transfers the grain from grain tank 36 to a truck or grain cart for transport, or to another receiving bin for holding.

A faceplate 40 is coupled to housing frame 30 of feeder house 16, to which harvesting header 18 may be releasably mounted. More particularly, in the present embodiment faceplate 40 is pivotally connected by a pivot mechanism 42 to housing frame 30 of feeder house 16 to facilitate a lateral (side-to-side) pivoting of faceplate 40 relative to housing frame 30 on an axis of motion 44. In the present embodiment, axis of motion 44 extends in a direction parallel to a direction of ground motion of combine 10. Pivot mechanism 42 may be, for example, a shaft/bearing arrangement. Hard stops (not shown) may be used to limit the extent that faceplate 40 is permitted to pivot in either direction at axis of motion 44.

Figure 3:
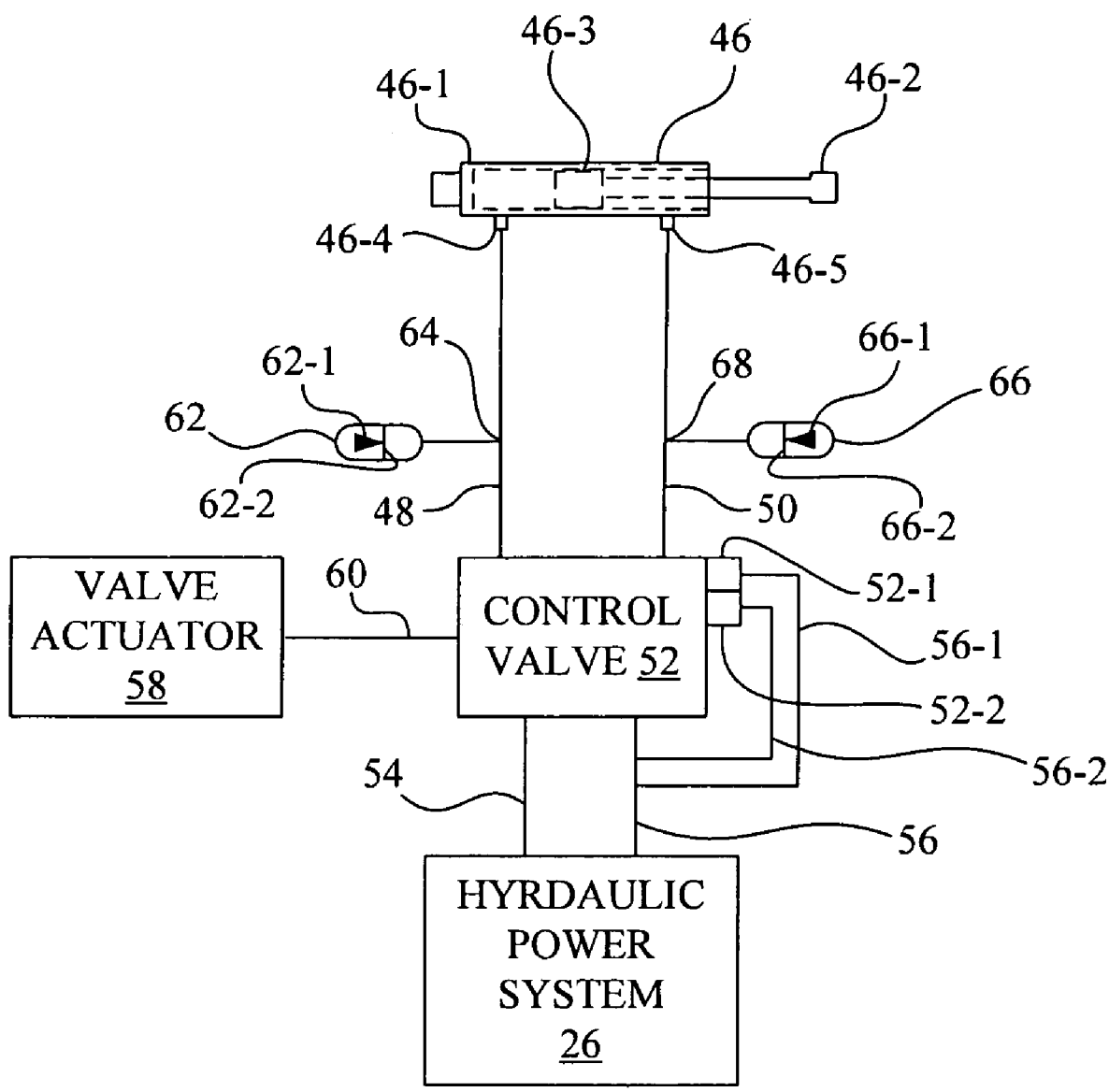
FIG. 3 is a block diagram representing a lateral tilt hydraulic circuit for use with the feeder house of FIG. 2.

As shown in FIGS. 2 and 3, a lateral tilt hydraulic cylinder 46 has a first end 46-1, a second end 46-2, and an operating piston 46-3. The first end 46-1 is formed integral with the cylindrical barrel of lateral tilt hydraulic cylinder 46, and first end 46-1 is connected to housing frame 30. The second end 46-2 is connected to operating piston 46-3, and second end 46-2 is connected to faceplate 40 at a location to facilitate movement of faceplate 40 relative to housing frame 30 on axis of motion 44.

Lateral tilt hydraulic cylinder 46 has a first hydraulic port 46-4 and a second hydraulic port 46-5. First hydraulic port 46-4 is connected in fluid communication with hydraulic power system 26 via a fluid conduit 48 for effecting an extension movement of operating piston 46-3 of lateral tilt hydraulic cylinder 46. Second hydraulic port 46-5 is connected in fluid communication with hydraulic power system 26 via a fluid conduit 50 for effecting a retraction movement of operating piston 46-3 of lateral tilt hydraulic cylinder 46.

Interposed between fluid conduit 48 and hydraulic power system 26 is a control valve 52. Control valve 52 is connected in fluid communication with hydraulic power system 26 via a pressure line 54 and a return line 56. A valve actuator 58 is controllably connected to control valve 52 via communications link 60. Valve actuator 58 may be located in cab 12 for operation by a combine operator. Communications link 60 may be, for example, an electrical or fluid link.

During operation, upon selective actuation of valve actuator 58 lateral tilt hydraulic cylinder 46 pivots harvesting header 18 on first axis of motion 44 to adjust a side-to-side orientation of harvesting header 18 relative to housing frame 30 of feeder house 16.

As shown in FIG. 3, an accumulator 62 is connected in fluid communication with first hydraulic port 46-4 of lateral tilt hydraulic cylinder 46 by a T-fitting 64 inserted in fluid conduit 48. Accumulator 62 contains a compressible gas charge 62-1 (represented schematically by a triangle). The hydraulic fluid in fluid conduit 48 and the compressible gas charge 62-1 are separated by a bladder wall 62-2. The compressible gas charge 62-1 of accumulator 62 is adjustable to provide a desired hydraulic dampening associated with first hydraulic port 46-4 of lateral tilt hydraulic cylinder 46. The compressible gas may be, for example, nitrogen.

An accumulator 66 is connected in fluid communication with second hydraulic port 46-5 of lateral tilt hydraulic cylinder 46 by a T-fitting 68 inserted in fluid conduit 50. Accumulator 66 contains a compressible gas charge 66-1 (represented schematically by a triangle). The hydraulic fluid in fluid conduit 50 and the compressible gas charge 66-1 are separated by a bladder wall 66-2. The compressible gas charge 66-1 of accumulator 66 is adjustable to provide a desired hydraulic dampening associated with second hydraulic port 46-5 of lateral tilt hydraulic cylinder 46. The compressible gas may be, for example, nitrogen.

Control valve 52 may include a first pressure relief mechanism 52-1 and a second pressure relief mechanism 52-2. First pressure relief mechanism 52-1 is associated with first hydraulic port 46-4 of lateral tilt hydraulic cylinder 46. First pressure relief mechanism 52-1 has an adjustable first relief pressure, and when the first relief pressure is reached, hydraulic fluid is dumped back to the reservoir of hydraulic power system 26 via fluid conduit 56-1 and return line 56. Second pressure relief mechanism 52-2 is associated with second hydraulic port 46-5 of lateral tilt hydraulic cylinder 46. Second pressure relief mechanism 52-2 has an adjustable second relief pressure, and when the second relief pressure is reached, hydraulic fluid is dumped back to the reservoir of hydraulic power system 26 via fluid conduit 56-2 and return line 56. In some embodiments, for example, the first relief pressure and the second relief pressure may be set to be equal, or substantially so.

Figure 5:
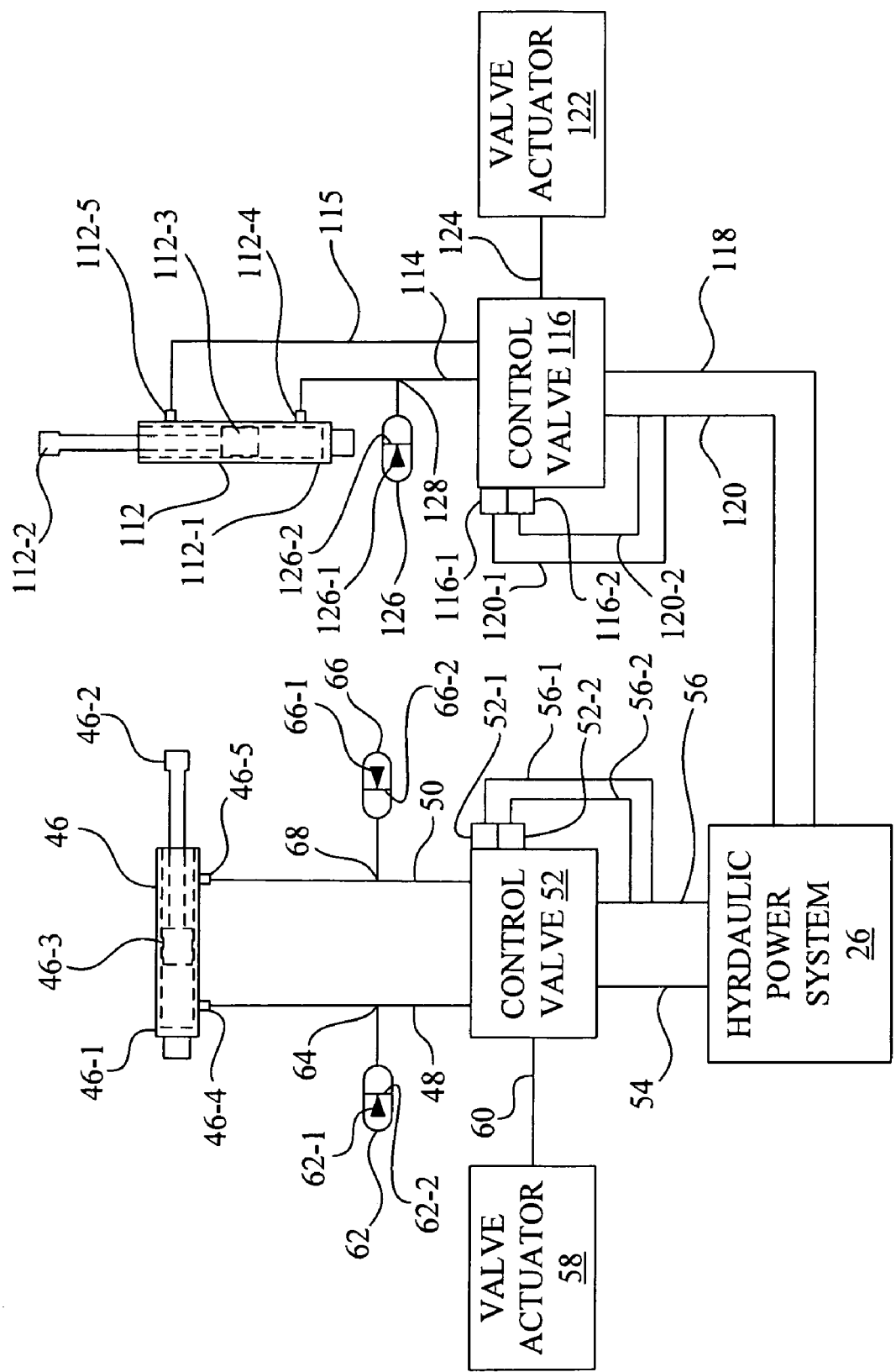
FIG. 5 is a block diagram representing a lateral tilt hydraulic circuit and a fore-aft tilt hydraulic circuit for use with the feeder house of FIG. 4.

In accordance with one embodiment of the present invention, at least one of the first relief pressure of first pressure relief mechanism 52-1 and compressible gas charge 62-1 is set so that hydraulic dampening is provided by accumulator 62 prior to reaching the first relief pressure of first pressure relief mechanism 52-1. Likewise, at least one of the second relief pressure of second pressure relief mechanism 52-2 and the compressible gas charge 66-1 is set so that hydraulic dampening is provided by accumulator 66 prior to reaching the second relief pressure of second pressure relief mechanism 52-2. As can be seen in FIGS. 3 and 5, hydraulic cylinder 46 is bi-directionally damped due to the containing of accumulator 62 and accumulator 66 respectively with each side of hydraulic cylinder 46, which work together to collectively define a bi-directional damping device. This arrangement allows for continuous bi-directional damping as well as bi-directional control by way of control valve 52.

For example, the respective relief pressures of pressure relief mechanisms 52-1 and 52-2 may be, for example, set to about 2400 psi (pounds per square inch) and the charges of the respective accumulators 62, 66 adjusted accordingly. Alternatively, the charges of the respective accumulators 62, 66 may be set to a predefined charge pressure, and the respective relief pressures of pressure relief mechanisms 52-1 and 52-2 may be set accordingly.

In accordance with another embodiment of the present invention, at least one of the first relief pressure of first pressure relief mechanism 52-1 and the compressible gas charge 62-1 is set so that hydraulic dampening is provided by accumulator 62 once the first relief pressure of first pressure relief mechanism 52-1 is reached. Likewise, at least one of the second relief pressure of second pressure relief mechanism 52-2 and compressible gas charge 66-1 is set so that hydraulic dampening is provided by accumulator 66 once the second relief pressure of second pressure relief mechanism 52-2 is reached. Here, the term "once the relief pressure . . . is reached" means when the hydraulic force in the respective fluid circuit of fluid conduit 48 or fluid conduit 50 is equal to or greater than the associated respective relief pressure.

For example, the respective relief pressures of pressure relief mechanisms 52-1 and 52-2 may be, for example, set to about 2400 psi (pounds per square inch) and the charges of the respective accumulators 62, 66 adjusted accordingly. Alternatively, the charges of the respective accumulators 62, 66 may be set to a predefined charge pressure, and the respective relief pressures of pressure relief mechanisms 52-1 and 52-2 may be set accordingly.

Figure 4:
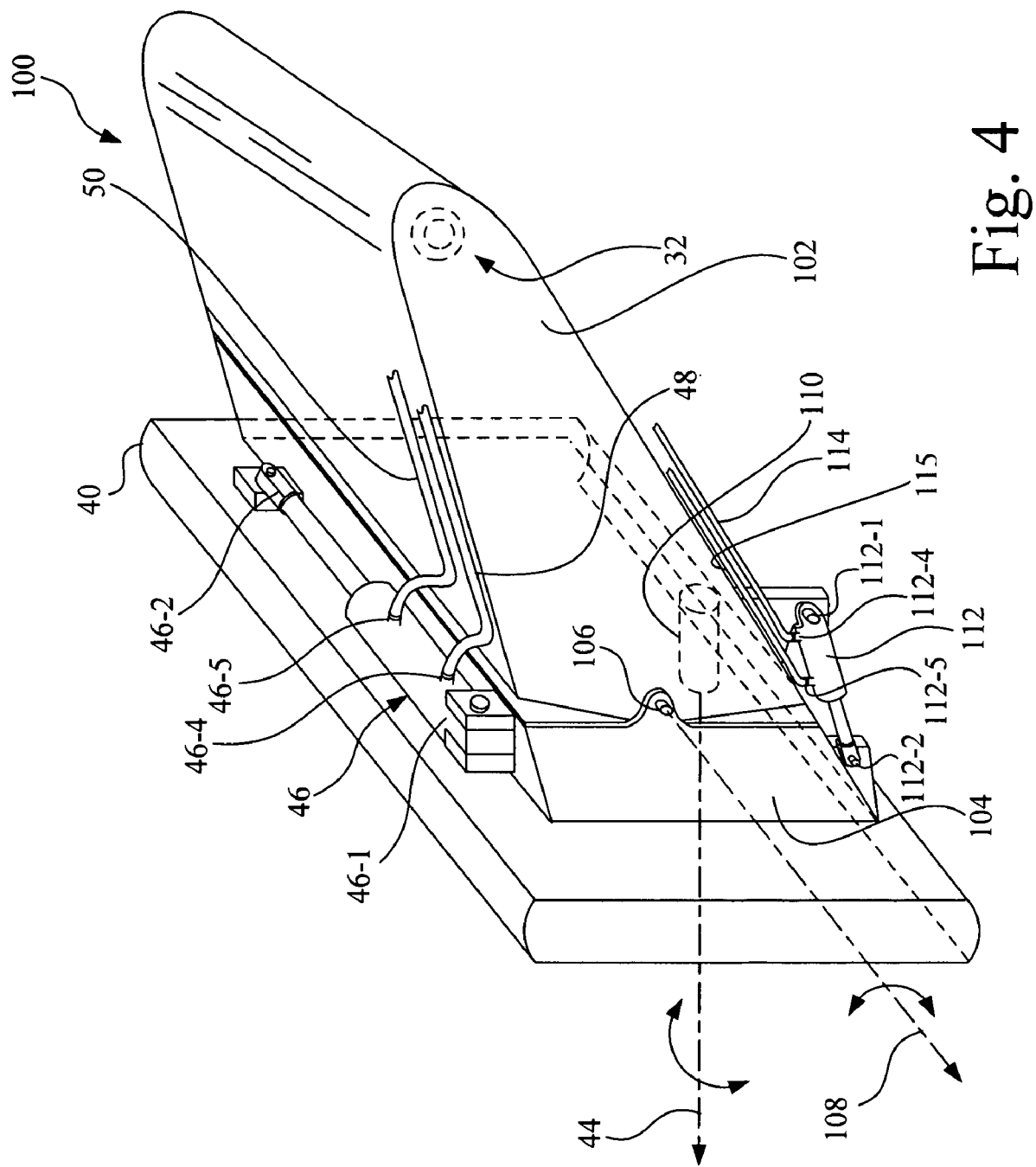
FIG. 4 is a diagrammatic perspective view of another embodiment of a feeder house for use on the combine of FIG. 1.

FIG. 4 is another embodiment of the invention showing a feeder house 100, which is a modification of, and may be used as a replacement for, feeder house 16.

Feeder house 100 includes a housing frame 102 configured to be pivotally mounted to support structure 14 (see FIG. 1) by pivots 32. Pivots 32 may be, for example, a shaft/bearing arrangement. An intermediate plate 104 is pivotally connected by a pair of pivot mechanisms 106 to housing frame 102 to facilitate a fore-aft pivoting of intermediate plate 104 relative to housing frame 102 on an axis of motion 108. Axis of motion 108 extends in a direction that is perpendicular to axis of motion 44. The pair of pivot mechanisms 106 (only one shown) are spaced apart along axis of motion 108, and are positioned on each side of housing frame 102.

Faceplate 40 is coupled to intermediate plate 104 to facilitate mounting of harvesting header 18. More particularly, in the present embodiment faceplate 40 is pivotally connected by a pivot mechanism 110 to intermediate plate 104 to facilitate a lateral (side-to-side) pivoting of faceplate 40 relative to intermediate plate 104, and in turn, relative to housing frame 102, on axis of motion 44. Thus, in the present embodiment, faceplate 40 is coupled to housing frame 102 via intermediate plate 104.

The first end 46-1 of lateral tilt hydraulic cylinder 46 is connected to intermediate plate 104. The second end 46-2 of lateral tilt hydraulic cylinder 46 is connected to faceplate 40 at a location to facilitate movement of faceplate 40 relative to intermediate plate 104, and in turn, relative to housing frame 102, on axis of motion 44.

Referring also to FIG. 5, the aspects of operation of lateral tilt hydraulic cylinder 46, the connections of lateral tilt hydraulic cylinder 46 to hydraulic power system 26 via control valve 52 (having pressure relief mechanisms 52-1, 52-2) and the use of accumulators 62 and 66, is identical to that described above with respect to FIG. 3, and thus for brevity will not be repeated here.

A fore-aft hydraulic cylinder 112 has a first end 112-1, a second end 112-2, and an operating piston 112-3. First end 112-1 is formed integral with the cylindrical barrel of fore-aft hydraulic cylinder 112, and first end 46-1 is connected to housing frame 102. The second end 112-2 is connected to operating piston 112-3, and second end 112-2 is connected to intermediate plate 104 to facilitate movement of intermediate plate 104 relative to housing frame 102.

Fore-aft hydraulic cylinder 112 has a plurality of hydraulic ports 112-4 and 112-5 for effecting movement of operating piston 112-3 of fore-aft hydraulic cylinder 112. Fore-aft hydraulic cylinder 112 may be configured as a double acting cylinder. Hydraulic port 112-4 is connected in fluid communication with hydraulic power system 26 via a fluid conduit 114 for effecting an extension movement of operating piston 112-3 of fore-aft hydraulic cylinder 112. Hydraulic port 112-5 is connected in fluid communication with hydraulic power system 26 via a fluid conduit 115 for effecting a retraction movement of operating piston 112-3 of fore-aft hydraulic cylinder 112. In an alternative embodiment, fore-aft hydraulic cylinder 112 may be configured as a single acting cylinder, with hydraulic port 112-5 adapted to vent to atmosphere, and with the retraction movement of operating piston 112-3 of fore-aft hydraulic cylinder 112 effected by the force of gravity.

Interposed between fluid conduit 114 and hydraulic power system 26, and between fluid conduit 115 and hydraulic power system 26, is a control valve 116. Control valve 116 is connected in fluid communication with hydraulic power system 26 via a pressure line 118 and a return line 120. A valve actuator 122 is controllably connected to control valve 116 via a communications link 124. Valve actuator 122 may be located in cab 12 for operation by a combine operator. Communications link 124 may be, for example, an electrical or fluid link. During operation, upon selective actuation of valve actuator 122 fore-aft hydraulic cylinder 112 pivots harvesting header 18 on axis of motion 108 to adjust a fore-aft tilt, i.e., to adjust an angle of attack, of harvesting header 18 relative to the ground G (see also FIG. 1).

An accumulator 126 is connected in fluid communication with first hydraulic port 112-4 of fore-aft hydraulic cylinder 112 by a T-fitting 128 inserted in fluid conduit 114. Accumulator 126 contains a first compressible gas charge 126-1 (represented schematically by a triangle). The hydraulic fluid in fluid conduit 114 and the compressible gas charge 126-1 are separated by a bladder wall 126-2. The compressible gas charge 126-1 of accumulator 62 is adjustable to provide a desired hydraulic dampening associated with first hydraulic port 112-4. The compressible gas may be, for example, nitrogen.

Control valve 116 may include a pressure relief mechanism 116-1 and a pressure relief mechanism 116-2. Pressure relief mechanism 116-1 is associated with hydraulic port 112-4 of fore-aft hydraulic cylinder 112. Pressure relief mechanism 116-2 is associated with hydraulic port 112-5 of fore-aft hydraulic cylinder 112. Pressure relief mechanism 116-1 has an adjustable relief pressure, and when the relief pressure is reached, hydraulic fluid is dumped back to the reservoir of hydraulic power system 26 via fluid conduit 120-1 and return line 120. Likewise, pressure relief mechanism 116-2 has an adjustable relief pressure, and when the relief pressure is reached, hydraulic fluid is dumped back to the reservoir of hydraulic power system 26 via fluid conduit 120-2 and return line 120.

In accordance with one embodiment of the present invention, at least one of the relief pressure of pressure relief mechanism 116-1 and compressible gas charge 126-1 is set so that hydraulic dampening is provided by accumulator 126 prior to reaching the relief pressure of pressure relief mechanism 116-1. For example, the relief pressure of pressure relief mechanism 116-1 may be, for example, set to about 2400 psi (pounds per square inch) and the compressible gas charge 126-1 of the accumulator 126 adjusted accordingly. Alternatively, the compressible gas charge 126-1 of the accumulator 126 may be set to a predefined charge pressure, and the relief pressure of pressure relief mechanism 116-1 may be set accordingly.

In accordance with another embodiment of the present invention, at least one of the relief pressure of pressure relief mechanism 116-1 and compressible gas charge 126-1 is set so that hydraulic dampening is provided by accumulator 126 once the relief pressure of pressure relief mechanism 116-1 is reached. Here, the term "once the relief pressure . . . is reached" means when the hydraulic force in the fluid circuit of fluid conduit 114 is equal to or greater than the associated relief pressure of pressure relief mechanism 116-1.

While the embodiment of FIGS. 4 and 5 is shown to include lateral tilt hydraulic cylinder 46, it is contemplated that in certain applications lateral tilt hydraulic cylinder 46 may not be necessary. Thus, if desired, the embodiment of FIGS. 4 and 5 may be modified to eliminate lateral tilt hydraulic cylinder 46, and combine intermediate plate 104 and faceplate 40.

Having described the preferred embodiment, it will become apparent that various modifications can be made without departing from the scope of the invention as defined in the accompanying claims.

The invention claimed is:

1. An agricultural harvester, comprising:
a power source;
a hydraulic power system coupled to said power source;
a feeder house drivably coupled to said power source, said feeder house having a housing frame;
a faceplate pivotally coupled to said housing frame to facilitate a pivoting of said faceplate relative to said housing frame on at least one axis of motion;
a hydraulic cylinder having a first end, a second end, and an operating piston, said first end being connected to said housing frame and said second end being coupled to said faceplate to facilitate movement of said faceplate relative to said housing frame, said hydraulic cylinder having a plurality of hydraulic ports for facilitating movement of said operating piston of said hydraulic cylinder, with at least a first hydraulic port of said plurality of hydraulic ports being connected in fluid communication with said hydraulic power system;
a first accumulator directly fluidly connected with said first hydraulic port of said hydraulic cylinder, said first accumulator containing a first compressible gas charge;
a second hydraulic port of said plurality of hydraulic ports of said hydraulic cylinder connected in fluid communication with said hydraulic power system; and
a second accumulator directly fluidly connected with said second hydraulic port of said hydraulic cylinder, said second accumulator containing a second compressible gas charge, thereby defining said hydraulic cylinder, said first accumulator and said second accumulator as a continuous bi-directional damping device.

2. The agricultural harvester of claim 1, further comprising:
a first pressure relief mechanism associated with said first hydraulic port of said hydraulic cylinder, said first pressure relief mechanism having an adjustable first relief pressure; and
said first compressible gas charge of said first accumulator is adjustable to provide a first hydraulic dampening associated with said first hydraulic port,
wherein at least one of said first relief pressure and said first compressible gas charge is set so that said first hydraulic dampening is provided by said first accumulator prior to said first pressure relief mechanism reaching said first relief pressure.

3. The agricultural harvester of claim 2, further comprising:
a second pressure relief mechanism associated with said second hydraulic port of said hydraulic cylinder, said second pressure relief mechanism having an adjustable second relief pressure; and
said second compressible gas charge of said second accumulator is adjustable to provide a second hydraulic dampening associated with said second hydraulic port,
wherein at least one of said second relief pressure and said second compressible gas charge is set so that said second hydraulic dampening is provided by said second accumulator prior to said second pressure relief mechanism reaching said second relief pressure.

4. The agricultural harvester of claim 1, wherein said hydraulic cylinder is mounted in a location to provide a lateral tilt of said faceplate relative to said housing frame with respect to a first axis of motion, and further comprising:
a harvesting header releasably mounted to said faceplate, and wherein said lateral tilt corresponds to a pivoting of said harvesting header on said first axis of motion to adjust a side-to-side orientation of said harvesting header relative to said housing frame of said feeder house.

5. The agricultural harvester of claim 1, wherein said hydraulic cylinder is mounted in a location to provide a fore-aft tilt of said faceplate relative to said housing frame with respect to a second axis of motion, and further comprising:
a harvesting header releasably mounted to said faceplate, and wherein said fore-aft tilt corresponds to a pivoting of said harvesting header on said second axis of motion to adjust an angle of attack of said harvesting header relative the ground.

6. An agricultural harvester, comprising:
a power source;
a hydraulic power system coupled to said power source;
a feeder house drivably coupled to said power source, said feeder house having a housing frame;
a faceplate pivotally connected to said housing frame to facilitate a lateral pivoting of said faceplate relative to said housing frame on an axis of motion;
a lateral tilt hydraulic cylinder having a first end, a second end, and an operating piston, said first end being connected to said housing frame and said second end being connected to said faceplate to facilitate movement of said faceplate relative to said housing frame on said axis of motion, said lateral tilt hydraulic cylinder having a first hydraulic port and a second hydraulic port in fluid communication with said hydraulic power system for effecting movement of an operating piston of said lateral tilt hydraulic cylinder;
a first accumulator directly fluidly connected with said first hydraulic port of said lateral tilt hydraulic cylinder, said first accumulator containing a first compressible gas charge; and
a second accumulator directly fluidly connected with said second hydraulic port of said lateral tilt hydraulic cylinder, said second accumulator containing a second compressible gas charge, said first accumulator and said second accumulator containing with said hydraulic cylinder to form a continuous bi-directional damping device damping movement of said faceplate.

7. The agricultural harvester of claim 6, further comprising a harvesting header mounted to said faceplate, wherein said lateral tilt hydraulic cylinder pivots said harvesting header on said axis of motion to adjust a side-to-side orientation of said harvesting header relative to said housing frame of said feeder house.

8. The agricultural harvester of claim 6, further comprising:
   a first pressure relief mechanism associated with said first hydraulic port of said lateral tilt hydraulic cylinder, said first pressure relief mechanism having an adjustable first relief pressure; and
   a second pressure relief mechanism associated with said second hydraulic port of said lateral tilt hydraulic cylinder, said second pressure relief mechanism having an adjustable second relief pressure,
   said first compressible gas charge of said first accumulator is adjustable to provide first hydraulic dampening associated with said first hydraulic port,
   said second compressible gas charge of said second accumulator is adjustable to provide second hydraulic dampening associated with said second hydraulic port,
   wherein at least one of said first relief pressure and said first compressible gas charge is set so that said first hydraulic dampening is provided by said first accumulator prior to said first pressure relief mechanism reaching said first relief pressure, and
   wherein at least one of said second relief pressure and said second compressible gas charge is set so that said second hydraulic dampening is provided by said second accumulator prior to said second pressure relief mechanism reaching said second relief pressure.

9. The agricultural harvester of claim 6, further comprising:
   a first pressure relief mechanism associated with said first hydraulic port of said lateral tilt hydraulic cylinder, said first pressure relief mechanism having an adjustable first relief pressure; and
   a second pressure relief mechanism associated with said second hydraulic port of said lateral tilt hydraulic cylinder, said second pressure relief mechanism having an adjustable second relief pressure,
   said first compressible gas charge of said first accumulator is adjustable to provide first hydraulic dampening associated with said first hydraulic port,
   said second compressible gas charge of said second accumulator is adjustable to provide second hydraulic dampening associated with said second hydraulic port,
   wherein at least one of said first relief pressure and said first compressible gas charge is set so that said first hydraulic dampening is provided by said first accumulator once said first pressure relief mechanism reaches said first relief pressure, and
   wherein at least one of said second relief pressure and said second compressible gas charge is set so that said second hydraulic dampening is provided by said second accumulator once said second pressure relief mechanism reaches said second relief pressure.

10. The agricultural harvester of claim 6, further comprising a harvesting header releasably mounted to said faceplate, and wherein said lateral tilt hydraulic cylinder pivots of said harvesting header on said axis of motion to adjust a side-to-side orientation of said harvesting header relative to said housing frame of said feeder house.

11. An agricultural harvester, comprising:
   a power source;
   a hydraulic power system coupled to said power source;
   a feeder house drivably coupled to said power source, said feeder house having a housing frame;
   an intermediate plate pivotally connected to said housing frame to facilitate a fore-aft pivoting of said intermediate plate relative to said housing frame on a first axis of motion;
   a faceplate coupled to said intermediate plate to facilitate mounting of a harvesting header;
   a fore-aft hydraulic cylinder having a first end, a second end, and an operating piston, said first end being connected to said housing frame and said second end being connected to said intermediate plate to facilitate movement of said intermediate plate relative to said housing frame, said fore-aft hydraulic cylinder having a plurality of hydraulic ports for effecting movement of said operating piston of said fore-aft hydraulic cylinder, with a first hydraulic port of said plurality of hydraulic ports being connected in fluid communication with said hydraulic power system;
   a first accumulator connected in fluid communication with said first hydraulic port of said fore-aft hydraulic cylinder, said first accumulator containing a first compressible gas charge, said faceplate is pivotally connected to said intermediate plate to facilitate a pivoting of said faceplate relative to said housing frame on a second axis of motion that extends in a direction perpendicular to a direction of extent of said first axis of motion;
   a lateral tilt hydraulic cylinder controllably connected to said hydraulic power system, and operably connected between said intermediate plate and said faceplate to facilitate movement of said faceplate relative to said housing frame on said second axis of motion; and
   at least two additional accumulators each being directly fluidly connected with said lateral tilt hydraulic cylinder such that said lateral tilt hydraulic cylinder is continuously bi-directionally damped.

12. The agricultural harvester of claim 11, further comprising:
   a first pressure relief mechanism associated with said first hydraulic port of said fore-aft hydraulic cylinder, said first pressure relief mechanism having an adjustable first relief pressure,
   said first compressible gas charge of said first accumulator is adjustable to provide a first hydraulic dampening associated with said first hydraulic port,
   wherein at least one of said first relief pressure and said first compressible gas charge is set so that said first hydraulic dampening is provided by said first accumulator prior to said first pressure relief mechanism reaching said first relief pressure.

13. The agricultural harvester of claim 11, further comprising:
   a first pressure relief mechanism associated with said first hydraulic port of said fore-aft hydraulic cylinder, said first pressure relief mechanism having an adjustable first relief pressure,
   said first compressible gas charge of said first accumulator is adjustable to provide a first hydraulic dampening associated with said first hydraulic port,
   wherein at least one of said first relief pressure and said first compressible gas charge is set so that said first hydraulic dampening is provided by said first accumulator once said first pressure relief mechanism reaches said first relief pressure.

14. The agricultural harvester of claim 11, further comprising said harvesting header releasably mounted to said faceplate, and wherein said fore-aft hydraulic cylinder pivots of said harvesting header on said first axis of motion to adjust an angle of attack of said harvesting header relative the ground.

* * * * *